(12) United States Patent
Erickson

(10) Patent No.: US 10,479,128 B2
(45) Date of Patent: Nov. 19, 2019

(54) SECURITY FEATURE

(71) Applicant: ASSA ABLOY AB, Stockholm (SE)

(72) Inventor: Brett Barton Erickson, San Jose, CA (US)

(73) Assignee: ASSA ABLOY AB, Stockholm (SE)

( * ) Notice: Subject to any disclaimer, the term of this patent is extended or adjusted under 35 U.S.C. 154(b) by 111 days.

(21) Appl. No.: 15/796,498

(22) Filed: Oct. 27, 2017

(65) Prior Publication Data

US 2019/0126661 A1 May 2, 2019

(51) Int. Cl.
*B42D 25/387* (2014.01)
*B42D 25/351* (2014.01)
(Continued)

(52) U.S. Cl.
CPC ............ *B42D 25/387* (2014.10); *B32B 3/266* (2013.01); *B32B 7/02* (2013.01); *B32B 27/08* (2013.01); *B32B 27/365* (2013.01); *B42D 25/346* (2014.10); *B42D 25/351* (2014.10); *B42D 25/455* (2014.10); *B42D 25/46* (2014.10); *B32B 5/142* (2013.01); *B32B 27/18* (2013.01); *B32B 37/06* (2013.01); *B32B 37/10* (2013.01); *B32B 2038/042* (2013.01); *B32B 2250/05* (2013.01); *B32B 2250/24* (2013.01); *B32B 2250/244* (2013.01); *B32B 2250/40* (2013.01); *B32B 2250/44* (2013.01); *B32B 2307/41* (2013.01); *B32B 2307/412* (2013.01); *B32B 2307/422* (2013.01); *B32B 2369/00* (2013.01); *B42D 13/00* (2013.01); *B42D 25/23* (2014.10); *B44F 1/066* (2013.01); *B44F 1/10* (2013.01);
(Continued)

(58) Field of Classification Search
None
See application file for complete search history.

(56) References Cited

U.S. PATENT DOCUMENTS 3,604,901 A * 9/1971 Morita ................ G06K 19/041
235/488
3,668,795 A * 6/1972 Barker .................. G06K 19/16
283/75
(Continued)

FOREIGN PATENT DOCUMENTS

CN       1422752 A  *  6/2003  ............ B42D 25/41
DE   19934434 A1 *  2/2001  ............ B42D 25/00
(Continued)

OTHER PUBLICATIONS

"International Application Serial No. PCT/IB2018/001344, International Search Report dated May 13, 2019", 6 pgs.
(Continued)

*Primary Examiner* — Jeffrey A Vonch
(74) *Attorney, Agent, or Firm* — Schwegman Lundberg & Woessner, P.A.

(57) ABSTRACT

A security document with unidirectional visual illumination is disclosed. A security feature is positioned within the document and not visible in normal ambient lighting conditions but becomes visible under specialized lighting conditions, for example in the presence of ultraviolet light. The security feature is constructible such that it is visible only from a single side of the security document, with the side being predeterminable regardless of the orientation of the specialized light.

21 Claims, 5 Drawing Sheets

(51) Int. Cl.

| | | |
|---|---|---|
| *B42D 25/346* | (2014.01) | |
| *B42D 25/455* | (2014.01) | |
| *B42D 25/46* | (2014.01) | |
| *B32B 27/08* | (2006.01) | |
| *B32B 27/36* | (2006.01) | |
| *B44F 1/06* | (2006.01) | |
| *B44F 1/10* | (2006.01) | |
| *B44F 1/14* | (2006.01) | |
| *B32B 3/26* | (2006.01) | |
| *B32B 7/02* | (2019.01) | |
| *B32B 5/14* | (2006.01) | |
| *B32B 38/04* | (2006.01) | |
| *B32B 27/18* | (2006.01) | |
| *B42D 25/23* | (2014.01) | |
| *B32B 37/06* | (2006.01) | |
| *B32B 37/10* | (2006.01) | |
| *B42D 13/00* | (2006.01) | |

(52) U.S. Cl.
CPC ............. *B44F 1/14* (2013.01); *Y10S 428/916* (2013.01); *Y10T 428/24298* (2015.01); *Y10T 428/24331* (2015.01); *Y10T 428/24339* (2015.01); *Y10T 428/24347* (2015.01)

(56) References Cited

U.S. PATENT DOCUMENTS

| | | | | |
|---|---|---|---|---|
| 4,304,809 A * | 12/1981 | Moraw | ............... | B42D 25/23 283/114 |
| 4,477,521 A * | 10/1984 | Lehmann | ............... | B32B 27/18 428/336 |
| 4,579,754 A * | 4/1986 | Maurer | ............... | B44B 7/002 428/29 |
| 4,766,026 A * | 8/1988 | Lass | ............... | G06K 19/06046 283/74 |
| 4,889,749 A * | 12/1989 | Ohashi | ............... | B42D 25/309 428/13 |
| 5,304,789 A * | 4/1994 | Lob | ............... | G06K 19/14 235/487 |
| 5,449,200 A * | 9/1995 | Andric | ............... | B32B 27/10 283/67 |
| 5,567,362 A * | 10/1996 | Gr Un | ............... | B29C 45/16 264/1.31 |
| 6,328,342 B1 * | 12/2001 | Belousov | ............... | G06K 19/06046 283/91 |
| 6,471,247 B1 * | 10/2002 | Hardwick | ............... | B42D 25/29 283/111 |
| 7,645,581 B2 | 2/2010 | Cruikshank et al. | | |
| 2005/0087606 A1 | 4/2005 | McCumber | | |
| 2005/0161512 A1 | 7/2005 | Jones et al. | | |
| 2005/0230959 A1 * | 10/2005 | Nemeth | ............... | B41M 3/14 283/74 |
| 2006/0127649 A1 * | 6/2006 | Keller | ............... | B42D 25/333 428/195.1 |
| 2006/0151989 A1 * | 7/2006 | Muke | ............... | B41M 1/24 283/67 |
| 2006/0197337 A1 * | 9/2006 | Merry | ............... | B42D 25/00 283/109 |
| 2006/0249951 A1 * | 11/2006 | Cruikshank | ............... | B42D 25/29 283/92 |
| 2006/0261171 A1 * | 11/2006 | Buursma | ............... | B42D 25/00 235/487 |
| 2007/0063053 A1 * | 3/2007 | Bergmann | ............... | B42D 25/29 235/487 |
| 2007/0194934 A1 * | 8/2007 | Tauber | ............... | B42D 25/43 340/572.8 |
| 2008/0193713 A1 * | 8/2008 | Hahn | ............... | B32B 38/06 428/130 |
| 2010/0001077 A1 * | 1/2010 | Kluge | ............... | B42D 25/00 235/488 |
| 2010/0047488 A1 * | 2/2010 | Syrjanen | ............... | B41M 3/14 428/29 |
| 2010/0104801 A1 * | 4/2010 | Syrjanen | ............... | B42D 25/00 428/138 |
| 2010/0253062 A1 * | 10/2010 | Hardwick | ............... | B42D 25/29 283/94 |
| 2011/0031316 A1 | 2/2011 | Morrill-Webb et al. | | |
| 2011/0141522 A1 * | 6/2011 | Vago | ............... | B41M 3/14 358/1.18 |
| 2011/0215563 A1 * | 9/2011 | Rancien | ............... | G06K 19/07749 283/113 |
| 2011/0298205 A1 * | 12/2011 | Pohjola | ............... | B42D 25/00 283/75 |
| 2012/0049506 A1 * | 3/2012 | Nikkila | ............... | B41M 3/144 283/85 |
| 2012/0091704 A1 * | 4/2012 | Pohjola | ............... | B42D 25/29 283/92 |
| 2012/0176652 A1 * | 7/2012 | Green | ............... | B41M 3/148 358/3.28 |
| 2012/0229255 A1 * | 9/2012 | Pohjola | ............... | B42D 25/351 340/5.86 |
| 2013/0069360 A1 * | 3/2013 | Power | ............... | B42D 25/351 283/85 |
| 2013/0147180 A1 * | 6/2013 | Batistatos | ............... | G03H 1/30 283/85 |
| 2013/0300101 A1 * | 11/2013 | Wicker | ............... | G07D 7/06 283/67 |
| 2013/0341900 A1 * | 12/2013 | Lazzari | ............... | B41M 3/148 283/75 |
| 2014/0125050 A1 * | 5/2014 | Liebler | ............... | B32B 27/06 283/85 |
| 2014/0197626 A1 * | 7/2014 | Le Loarer | ............... | B42D 25/29 283/85 |
| 2014/0290367 A1 * | 10/2014 | Domke | ............... | G01N 29/11 73/596 |
| 2014/0319817 A1 * | 10/2014 | Nikkila | ............... | B41M 3/144 283/85 |
| 2015/0085285 A1 * | 3/2015 | Jones | ............... | B32B 3/266 356/432 |
| 2015/0129780 A1 * | 5/2015 | Le Loarer | ............... | D21H 27/32 250/459.1 |
| 2015/0146297 A1 * | 5/2015 | Commander | ............... | B42D 25/30 359/627 |
| 2015/0210107 A1 * | 7/2015 | Nugent | ............... | B41M 3/14 283/77 |
| 2015/0219807 A1 * | 8/2015 | Lochbihler | ............... | G02B 5/1809 359/567 |
| 2015/0220056 A1 * | 8/2015 | Weiser | ............... | G03H 1/0011 430/2 |
| 2015/0224811 A1 | 8/2015 | Mercier | | |
| 2015/0228143 A1 * | 8/2015 | Eichenberger | ............... | G07D 7/12 382/135 |
| 2015/0239202 A1 * | 8/2015 | Purdy | ............... | B42D 25/00 428/138 |
| 2015/0283847 A1 * | 10/2015 | Lim | ............... | B32B 3/266 428/138 |
| 2015/0352887 A1 * | 12/2015 | Holmes | ............... | B42D 25/29 283/91 |
| 2016/0039241 A1 * | 2/2016 | Hardwick | ............... | B42D 25/00 283/70 |
| 2016/0200088 A1 * | 7/2016 | Schaede | ............... | B32B 38/04 156/108 |
| 2016/0257159 A1 * | 9/2016 | Attner | ............... | B32B 29/06 |
| 2016/0321959 A1 * | 11/2016 | Constantinou | ............... | G09F 3/0291 |
| 2016/0332477 A1 * | 11/2016 | Kuczynski | ............... | B42D 25/43 |
| 2016/0339653 A1 * | 11/2016 | Berthon | ............... | B29D 11/00278 |
| 2018/0050555 A1 * | 2/2018 | Berthe | ............... | B42D 25/23 |
| 2018/0117950 A1 * | 5/2018 | Power | ............... | B42D 25/355 |
| 2018/0147881 A1 * | 5/2018 | Endres | ............... | B42D 25/23 |
| 2018/0186164 A1 * | 7/2018 | Wu | ............... | B42D 25/309 |
| 2018/0186166 A1 * | 7/2018 | Holmes | ............... | B29D 11/00298 |
| 2018/0290478 A1 * | 10/2018 | Sugdon | ............... | B42D 25/455 |
| 2018/0322378 A1 * | 11/2018 | Khairallah | ............... | G06K 19/07722 |
| 2018/0326777 A1 * | 11/2018 | Reddy | ............... | B42D 25/41 |

(56) References Cited

U.S. PATENT DOCUMENTS

| | | | |
|---|---|---|---|
| 2019/0001733 A1* | 1/2019 | Zinke | B42D 25/41 |
| 2019/0061408 A1* | 2/2019 | Erickson | B41M 3/144 |

FOREIGN PATENT DOCUMENTS

| | | | | |
|---|---|---|---|---|
| DE | 102006051524 A1 * | 4/2008 | | B42D 25/29 |
| DE | 102007012696 A1 * | 9/2008 | | B42D 25/41 |
| DE | 102007037982 A1 * | 2/2009 | | B42D 25/29 |
| DE | 102008053582 B3 * | 4/2010 | | G06K 19/14 |
| DE | 102011010127 A1 * | 8/2012 | | G09F 3/0291 |
| DE | 102011004934 A1 * | 9/2012 | | B32B 3/26 |
| DE | 102011004935 A1 * | 9/2012 | | B32B 3/266 |
| DE | 102011114211 A1 * | 3/2013 | | D21H 21/42 |
| DE | 102012204340 A1 * | 9/2013 | | B42D 25/29 |
| DE | 102014015280 A1 * | 4/2016 | | B42D 25/41 |
| DE | 102014016249 A1 * | 5/2016 | | B41M 3/14 |
| DE | 102015102037 A1 * | 8/2016 | | B42D 25/351 |
| EP | 0916519 A1 * | 5/1999 | | G06K 19/14 |
| EP | 1935663 A1 | 6/2008 | | |
| EP | 2028017 A2 * | 2/2009 | | D21H 21/42 |
| EP | 2199098 A1 * | 6/2010 | | B42D 25/29 |
| EP | 2236311 A1 * | 10/2010 | | B42D 25/29 |
| EP | 2384901 A1 * | 11/2011 | | B42D 25/29 |
| EP | 2540519 A1 * | 1/2013 | | B41M 3/14 |
| EP | 2559563 A1 * | 2/2013 | | B42D 25/45 |
| EP | 2886364 A2 * | 6/2015 | | B42D 25/455 |
| EP | 2780173 | 10/2016 | | |
| EP | 3095615 A1 * | 11/2016 | | |
| FR | 2978082 A1 * | 1/2013 | | B42D 25/00 |
| GB | 2219525 A * | 12/1989 | | C09J 7/38 |
| GB | 2530082 A * | 3/2016 | | B42D 25/36 |
| JP | 2010194757 A * | 9/2010 | | |
| WO | WO-9718092 A1 * | 5/1997 | | G06K 1/126 |
| WO | WO-2006066803 A1 * | 6/2006 | | B42D 25/41 |
| WO | WO-2007099017 A2 * | 9/2007 | | B42D 25/328 |
| WO | WO 2011/070122 | 6/2011 | | |
| WO | WO-2011138007 A1 * | 11/2011 | | B42D 25/41 |
| WO | WO-2013013807 A1 * | 1/2013 | | B32B 37/185 |
| WO | WO 2014/035757 | 3/2014 | | |
| WO | WO-2014076275 A1 | 5/2014 | | |
| WO | WO-2014184559 A1 * | 11/2014 | | B42D 25/29 |
| WO | WO-2014184560 A1 * | 11/2014 | | B42D 25/29 |
| WO | WO-2014199296 A1 * | 12/2014 | | B42D 25/29 |
| WO | WO-2014203199 A1 * | 12/2014 | | B42F 7/145 |
| WO | WO-2015025559 A1 * | 2/2015 | | C08J 5/18 |
| WO | WO-2015092741 A1 * | 6/2015 | | B32B 27/205 |
| WO | WO-2015112105 A1 * | 7/2015 | | B42D 25/455 |
| WO | WO-2017005633 A1 * | 1/2017 | | G07D 7/21 |
| WO | WO-2017005685 A1 * | 1/2017 | | B42D 25/45 |
| WO | WO-2017060688 A1 * | 4/2017 | | B42D 25/30 |
| WO | WO-2017202650 A1 * | 11/2017 | | B42D 25/351 |
| WO | WO-2019002084 A1 * | 1/2019 | | B42D 25/36 |
| WO | WO-2019039524 A1 * | 2/2019 | | |
| WO | WO-2019046975 A1 * | 3/2019 | | B42D 25/41 |
| WO | WO-2019081984 A2 | 5/2019 | | |

OTHER PUBLICATIONS

"International Application Serial No. PCT/IB2018/001344, Written Opinion dated May 13, 2019", 11 pgs.

"International Application Serial No. PCT/IB2018/001344, Invitation to Pay Additional Fees dated Mar. 21, 2019", 12 pgs.

* cited by examiner

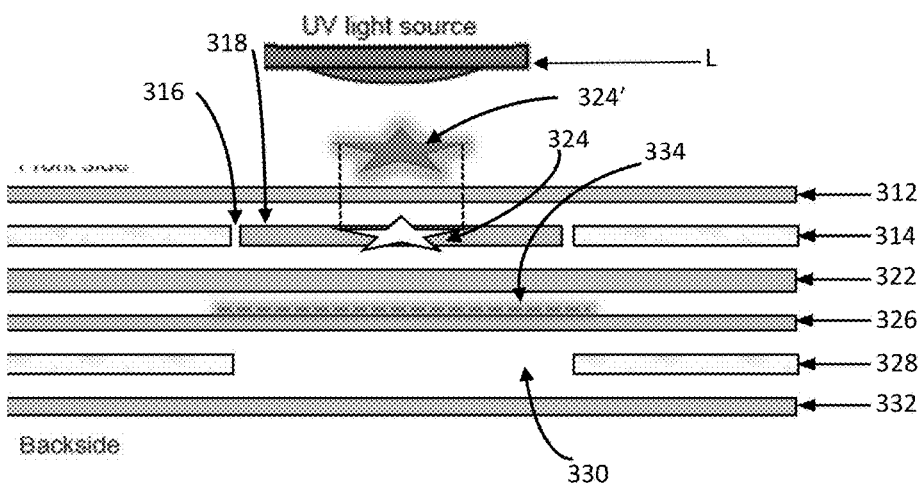
Fig. 3A
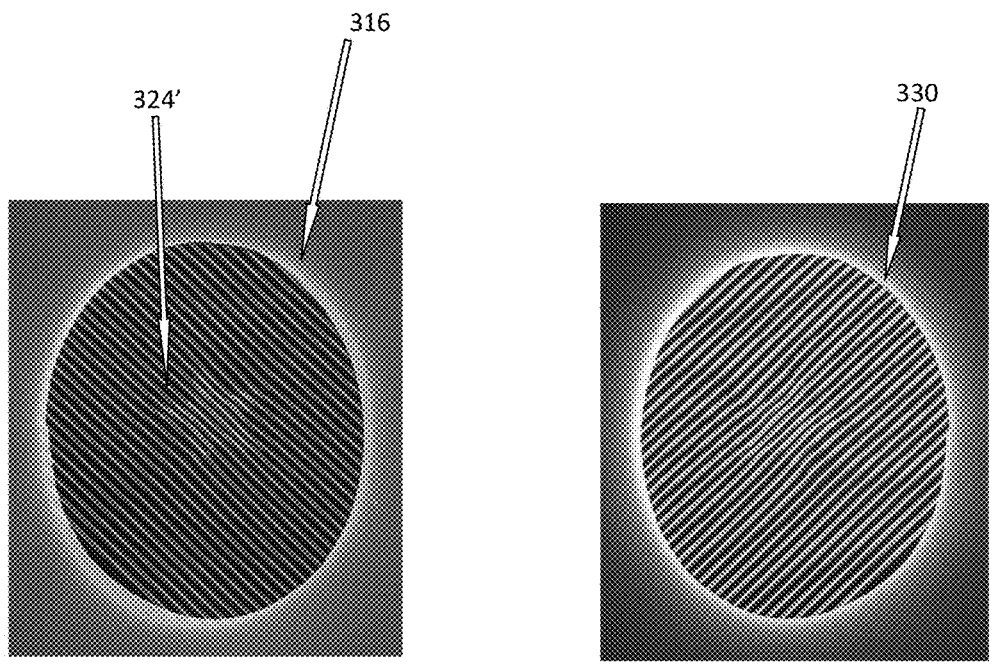
Fig. 3B  Fig. 3C

SECURITY FEATURE

FIELD OF THE INVENTION

The present disclosure is generally directed toward security features and methods of incorporating security features into identification documents (IDs), credentials, passports, substrates and laminated cards.

BACKGROUND

In today's world, people often are required to prove their identity to other people, such as strangers or security personnel, or to access control devices. The use of identification documents and other credentials is pervasive. Credentials are most commonly used to prove identity, to verify age, to access an asset (e.g., secure area, financial account, computing resource, etc.), to evidence driving privileges, to cash a check, and so on. Airplane passengers are required to show a credential during check in, and sometimes at security screening and prior to boarding a flight. We also live in an ever-evolving cashless society where credentials are used to make payments, access an automated teller machine (ATM), debit an account, or make a payment, etc. Many industries require that their employees carry photo identification credentials on the job and to access various locations on a job site. If verification is performed by a person, the inquiring person is left to assume that the proffered identification is authentic (i.e., it was produced by a reputable or trusted third-party and it properly identifies the holder).

Methods and devices for identifying people have matured over the years and have become more complex, particularly depending upon the purpose or context in which the identification is needed. Higher stake situations compel higher levels of security. As a result, identification features and methods have evolved to meet demand and in response to counterfeiting and other efforts to circumvent existing forms of identification. Simple photo identification badges are one form of early identification but are still in use today. The addition of graphics and printing provided further ways to lend authentication to an ID. Further identifying or verification data was added to IDs in the form of magnetic stripes or bar codes. Still further levels of security and additional data was added with embedded microchips, and was enhanced as the processing power and capacity of such chips increased simultaneous with the decrease in physical size of such chips.

More recently, measures to combat counterfeiting have evolved to include holograms and biometric data and scanners. However, counterfeiting operations have also evolved in their complexity to keep up with the countermeasures. Accordingly, a continuing need exists to develop and implement effective countermeasures (e.g., security features) for identification documents. Moreover, a need exists to develop effective countermeasures that are relatively cost effective but nonetheless incorporate an inherent level of trust.

U.S. published patent application 2005/0087606, the entirety or which is incorporated herein by reference, is directed to a card utilizing the fluorescence of ultraviolet ink as a security or authentication feature. The card has indicia or encoding that is non-visible to the unaided human eye. The non-visible indicia can be made with ultraviolet or infrared ink that is preferably printed on the card with an ink jet printer. The indicia may be provided on one of the major card surface or along the perimeter edge of the card, or may extend through the entirety of the card between the major surfaces. The indicia can provide a basis for determining the authenticity of the card. The indicia can comprise numbers, letters, symbols or other marks. When the indicium extends through the card, the indicium is visible when viewed from both sides of the card. If the indicium does not extend through the card, nothing is visible from the opposite side of the card. Moreover, because the process permits the indicium to be added following manufacture of the card, this type of added security feature may be more easily counterfeited.

U.S. Pat. No. 7,654,581, the entirety of which is incorporated herein by reference, discloses a double ultraviolet security feature for use with a security document. The security document utilizes a transparent ultraviolet blocking agent positioned within the region of a transparent window formed in the document. A pattern made with ultraviolet ink and positioned within the area of the transparent window on one side of the ultraviolet blocking agent will be visible only from that one side of the document when illuminated on that side of the document, and will not be viewable from the other side of the document. Similarly, a pattern made with ultraviolet ink and positioned within the area of the transparent window on the opposite side of the ultraviolet blocking agent will only be viewable from the opposite side of the blocking agent when illuminated on that same side of the document. An ultraviolet light source must be used on each side of the security document to illuminate both patterns simultaneously. Because of the use of the ultraviolet blocking agent, when an ultraviolet light source illuminates one side of the security document, not only is no pattern viewable of the opposite side, no fluorescence of any kind is viewable from the opposite side.

Although the foregoing examples of security or authentication features are generally sufficient as designed, security and authentication features taking advantage of the fluorescence of ultraviolet fluorescent inks or infrared inks may be achieved in other ways utilizing other techniques disclosed herein that provide additional tools for providing enhanced security and authentication while thwarting counterfeiting efforts.

SUMMARY OF THE INVENTION

It is one aspect of the present disclosure to provide an identification document with one or more enhanced security features. An identification document and method of making the identification document is disclosed. In one embodiment, the identification document is a laminated substrate or finished card.

As used herein, the terms security document and identification documents (IDs) include but are not limited to driving licenses, identity cards, membership cards, badges or passes, passports, discount cards, banking cards (credit and debit), money cards, access cards and the like.

According to aspects of the present disclosure, a photoluminescent security feature is provided that is visibly different when viewed from opposite sides of the ID. In one embodiment, a first cut out or hole is formed in a clear non-laserable polycarbonate core layer sandwiched between opposing layers of clear laserable polycarbonate. One of the layers of laserable polycarbonate further includes a layer or area of ultraviolet fluorescent ink. The layer of ultraviolet ink may cover the entire surface of one of the layers of laserable polycarbonate or just a portion or area of the surface. If the ink covers less than the entirety of the surface of the laserable polycarbonate, when the layers are assembled, the area of ultraviolet ink should align with the first cut out in the core layer. The ultraviolet ink may be applied to the surface of the laserable polycarbonate that adjoins the core non-laserable layer containing the cut out or the opposite side of the laserable polycarbonate layer. As part of the elevated temperature and pressure applied during the lamination process to join the layers together, the clear laserable polycarbonate softens or melts and fills the void made by the first cut out in the core layer. Thus, the cut out is filled with clear laserable polycarbonate and the surrounding material is clear non-laserable polycarbonate. In addition to these three layers, an opaque layer of polycarbonate is added to the outer surface of each of the laserable polycarbonate layers. The opaque layer blocks the transmission of UV light. White polycarbonate is an example of an opaque material, but other colors that are opaque are substitutable. A window or cut out is formed in each of these opaque layers and extends through the entirety of each opaque layer. Each of the windows is positioned to align with the first cut out in the core layer when the layers are assembled. An outer layer of clear laserable polycarbonate is added to the outer surface of each of the opaque layers. An insert formed of clear laserable polycarbonate may be positioned in each of the windows in the opaque layers prior to lamination or, alternatively, the surrounding layers of clear laserable polycarbonate may soften or melt during the lamination process and fill the void made by the windows in the opaque layers. If the later, the thickness of the layers may need to be adjusted to accommodate for the amount of material needed to fill the windows.

With the foregoing structure, a unique visual effect is achieved. According to some embodiments, when an ultraviolet light source illuminates the side of the ID where the area of UV ink is positioned between the light source and the first cut out in the core layer, the pattern of the first cut out in the core layer will be prominently illuminated only on the opposite side of the ID. If a UV light source illuminates the opposite side of the ID, where the first cut out in the core layer is positioned between the area of UV ink and the light source, the pattern of the first cut out is not visible. However, in both scenarios, the ultraviolet ink fluoresces and is visible from both sides of the ID regardless of which side of the ID the UV light source is positioned. The UV ink may be applied as a pattern or a solid. Further still, in the absence of an ultraviolet light source, the cut out in the core layer will not be visible from either side of the ID. Thus, the side of the ID from which the cut out in the core layer is visible may be predetermined based upon the location of the area or layer of UV ink relative to the cut out in the core layer. If other indicia are provided on the ID, for example markings and/or graphics to differentiate a front side and a backside, the side on which the cut out is illuminated can be pre-determined to correspond with other indicia. It will be expected that the cut out in the core layer is visible from a specific side, but not the other side. The varied result, namely, a repeatable but different illuminated visual effect on opposite sides of the ID, provides a method for authenticating the veracity of the ID.

According to other aspects for the present disclosure, in a second embodiment the overall structure of the ID remains generally the same except one of the opaque layers is the core layer. More particularly, the first cut out pattern is formed in a clear non-laserable polycarbonate insert positioned in the window of one of the opaque layers such that the first cut out is physically closer to the outer surface of the ID than is the area of UV fluorescent ink. The area or layer of UV ink remains physically located between the two opaque layers. When the UV light source is positioned such that the first cut out is located between the light source and the area of UV ink, the pattern of the cut out will fluoresce and be visible from both sides of the ID, but the pattern will be more strongly illuminated on the side of the ID with the light source. If the space between the first cut out and the area of UV ink is increased, the pattern will still be illuminated on both sides of the ID but each illumination will be diminished in strength with the illumination on the side with the light source still being stronger. Thus, the illumination can be enhanced or diminished by altering the spacing between the first cut out and the area of UV ink. In both scenarios, the ultraviolet ink fluoresces and is visible from both sides of the ID regardless of which side of the ID the UV light source is positioned. However, as is the case with the cut out in the core layer, the illumination of the UV ink is weaker when viewed from the side of the ID without the UV light source. The net visual result is that the pattern or silhouette of the first cut out is present on both sides of the ID but illuminated differently on opposite sides of the ID. Similarly, the fluorescing UV ink is visible from both sides of the ID, but the strength of the illumination differs from one side to the other. If additional indicia are added to the ID such that a front side and backside are defined in the same way as with an ID made according to the first embodiment, the illuminated cut out pattern of the core layer can be utilized to enhance the overall visual impression differently on opposite sides of the ID. In the absence of an ultraviolet light source, the cut out in the core layer will not be visible from either side of the ID. When the UV light source is moved to the opposite side of the ID, such that the area of UV ink is located between the light source and the first cut out in the core layer, the UV ink layer is still illuminated, but the pattern of the first cut out is not illuminated. The pattern of the first cut out may be faintly observable, but this is likely dependent upon the manner in which the UV ink is applied. If the UV ink is applied in a pattern, such as in stripes, during the lamination process the stripes of ink may move or distort due to the polycarbonate material flowing to fill the cut out in the core layer. Thus, while the cut out itself is not illuminated in a prominent way, the distortion of the UV ink pattern may be visible when an ultraviolet light source is applied. Conversely, if the UV ink is applied as a solid pattern, without any variation, the effects of the lamination process will be less pronounced if not eliminated altogether.

According to aspects of the present disclosure, a secure laminate is provided comprising a core layer, at least a portion of which is clear non-laserable polycarbonate, the core layer having a first major surface and a second major surface opposing the first major surface, and a hole or cut out passing through the at least clear non-laserable polycarbonate portion, the hole having a shape and filled with clear laserable polycarbonate; a first clear laserable polycarbonate layer positioned adjacent the first major surface of the core layer; a second clear laserable polycarbonate layer positioned adjacent the second major surface of the core layer; a first opaque layer positioned adjacent the first clear laserable polycarbonate layer and on the opposite side of the first clear laserable polycarbonate layer from the core layer, and a first window formed through the first opaque layer, the first window aligned with the hole, the first opaque layer defining a front side of the laminate; a second opaque layer positioned adjacent the second clear laserable polycarbonate layer and on the opposite side of the second clear laserable polycarbonate layer from the core layer, and a second window formed through the second opaque layer, the second window aligned with the hole and the first window, the second opaque layer defining a backside of the laminate; and an area of ultraviolet fluorescent ink positioned between the first opaque layer and the core layer, and aligned with the first and second windows and the hole; wherein, in ambient light conditions the hole is not visible from either the front side of the laminate through the first window or from the backside of the laminate through the second window, when an ultraviolet light source is directed at the front side of the laminate the shape of the hole is illuminated through the second window on the backside of the laminate but not through the first window on the front side of the laminate and when an ultraviolet light source is directed at the backside of the laminate, the shape of the hole is not illuminated through either the first window or the second window.

According to aspects of the present disclosure, a secure laminate is provided comprising a core layer, at least a portion of which is clear non-laserable polycarbonate, the core layer having a first major surface and a second major surface opposing the first major surface, and a hole passing through the at least clear non-laserable polycarbonate portion, the hole having a shape and filled with clear laserable polycarbonate; a first clear laserable polycarbonate layer positioned adjacent the first major surface of the core layer, and defining a front side of the laminate; a second clear laserable polycarbonate layer positioned adjacent the second major surface of the core layer, and defining a backside of the laminate; an area of ultraviolet fluorescent ink positioned between the first opaque layer and the core layer, and aligned with the first and second windows and the hole; wherein, in ambient light conditions the hole is not visible from either the front side of the laminate or the backside of the laminate, when an ultraviolet light source is directed at the front side of the laminate the shape of the hole is illuminated and visible from the front side of the laminate but not from the backside of the laminate, and when an ultraviolet light source is directed at the backside of the laminate, the shape of the hole is illuminated and visible from the front side of the laminate but from the back side of the laminate.

It is believed that the same results can be obtained with infrared fluorescent ink that emits light in the near infrared spectrum of about 700 nm to 1100 nm. An infrared camera, rather than the unassisted human eye, is needed to detect the fluorescent ink.

According to other aspects of the present disclosure, the shape of the cut out in the core layer can change. In one example it may be a specific geometric shape, such as a star pattern. It could be any other geometric shape. The cut out could also be in the form of a logo or symbol such as a trademark or brand, one or more words, or a combination of these. The ultraviolet fluorescent ink may be a single color or multiple colors. The ink may be applied in a striped pattern. The size of the stripes may vary. The stripes may be discontinuous, as in the form of dashes. The ink may be applied in other patterns, such as concentric circles, triangles, squares of other shapes. The pattern may be a grid or an array of repeating or varying shapes. In one embodiment, the illumination visible on one side of the ID excludes the pre-determined pattern of the cut out in the core layer, and includes the illuminated pattern on the opposite side of the card. In another embodiment, the illumination visible on both sides of the ID can include the pre-determined cut out pattern in the core layer, but the degree or strength of the illumination is different.

The present disclosure will be further understood from the drawings and the following detailed description. Although this description sets forth specific details, it is understood that certain embodiments of the invention may be practiced without these specific details.

DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

FIG. 3A is a cross-sectional exploded view of a third embodiment of a laminated identification device according to the present disclosure.

FIG. 3B is a top plan view of the window taken from the front side of FIG. 3A.

FIG. 3C is a bottom plan view of the window taken from the backside of FIG. 3A.

DETAILED DESCRIPTION

With reference to FIGS. 1A-3C, security features for laminate structures, methods of producing laminate structures, and authentication methods will be described. While the description and figures are generally directed toward security features in laminate structures, it should be appreciated that embodiments of the present disclosure are not so limited. Moreover, while specific examples will be described in connection with laminated identification documents, it should be appreciated that the concepts disclosed herein can be utilized in other laminate and non-laminate structures and do not necessarily have to be applied to identification documents.

Figure 1A:
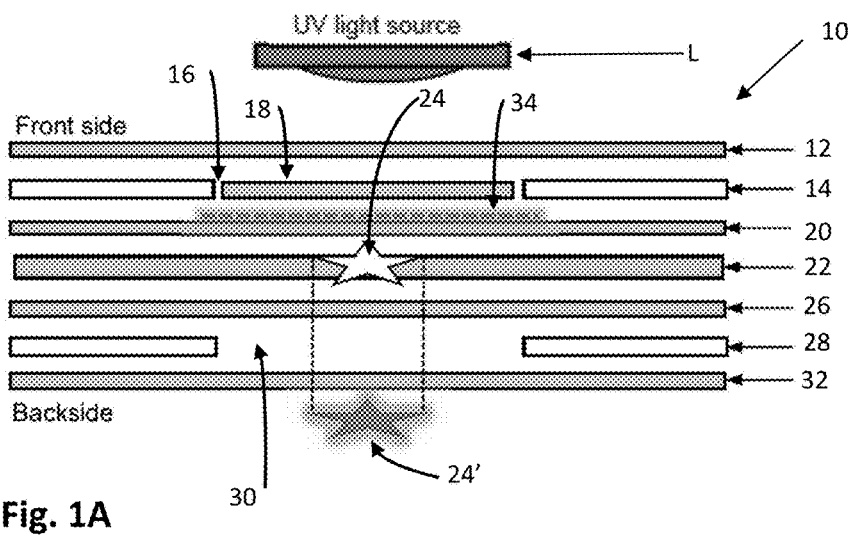
FIG. 1A is a cross-sectional exploded view of a first embodiment of a laminated identification device according to the present disclosure, with a UV light illuminating the front side of the ID.
Figure 1B:
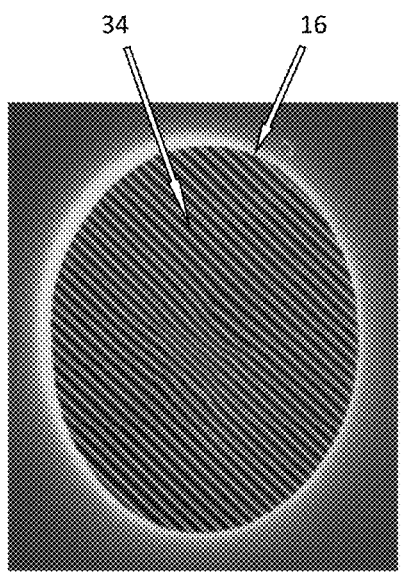
FIG. 1B is a top plan view of the window taken from the front side of FIG. 1A.
Figure 1C:
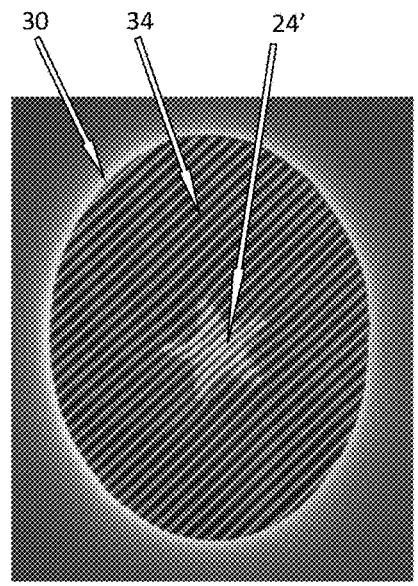
FIG. 1C is a bottom plan view of the window taken from the backside of FIG. 1A.

Turning to FIGS. 1A-1C, a first embodiment of an identification device according to aspects of the present disclosure is illustrated. In this embodiment, an identification document in the form of a laminated substrate 10 with seven layers is described. All of the layers are polycarbonate. The top layer or front side of the substrate 12 is clear laserable polycarbonate that is 100μ thick. Moving toward the backside of the substrate, the next inner layer 14 is a white polycarbonate with a window or hole 16. The white polycarbonate is opaque and substantially non-transparent to visible light, UV light, IR light and other forms of light around the visible light spectrum. The hole 16 extends through the layer 14 and forms a first window 16. In this embodiment, the window 16 is oval shaped and is filled with an oval shaped clear laserable polycarbonate insert 18 of the same thickness. Alternatively, the clear laserable polycarbonate from surrounding layers, such as layer 12, can fill the window 16 when elevated heat and pressure is applied during the lamination process. The next innermost layer 20 is clear laserable polycarbonate that is 100μ thick. The next innermost layer 22, also the middle or core layer in this embodiment, is a clear non-laserable polycarbonate layer that is 7 thousandths of an inch (7 mils) thick. In addition, a uniquely shaped hole 24 is cut out from this layer. In this embodiment, the cut out or hole 24 is star shaped. Continuing to move toward the backside of the substrate, the next layer 26 is clear laserable polycarbonate that is 100μ thick. The next layer 28 is opaque polycarbonate that is 100μ thick and has a hole 30 cut completely through the layer that forms a second window 30. In this embodiment the hole 30 is oval shaped. Like layer 14, the polycarbonate in layer 28 is white and substantially non-transparent to visible light, UV light, IR light and other forms of light around the visible light spectrum. Polycarbonate of any color is substitutable provided it is substantially non-transparent to visible light, UV light, IR light and other forms of light around the visible spectrum. The final or backside layer 32 is clear laserable polycarbonate that is 100μ thick. A layer or area of ultraviolet fluorescent ink 34 is added to the surface of layer 20. In this embodiment, the ultraviolet ink is blue, but any other color of ultraviolet fluorescent ink may be used. In this embodiment, the ink is applied in a striped pattern, but a different pattern could be used, including stripes of varying thickness, intermittent stripes or dashes, geometric shapes, solids, or a combination of two or more of these. Instead of being applied on the front side of layer 20, the ultraviolet ink layer 34 could be applied on the backside surface of layer 20 or on the backside surface of insert 18. An ultraviolet light source L is also shown. The thicknesses of the various layers may also vary.

The layers are assembled and subjected to lamination. During the lamination process, elevated temperatures and pressures are applied. According to one acceptable lamination process, heat is applied at 180 degrees centigrade simultaneously with 2.5 tons of pressure for 800 seconds, followed by a cooling process where a temperature of 23 degrees centigrade and a pressure of 20 tons are applied for 800 seconds. As a result, the window 30 fills with softened clear laserable polycarbonate from the adjacent layers 26 and 32. Alternatively, a clear laserable polycarbonate insert similar to insert 18 could be positioned in the hole 30. In addition, also during the lamination process, the clear laserable polycarbonate from layers 20 and 26 melt and flow to fill the hoe 24 formed in the clear non-laserable polycarbonate layer 22. As a result, an area of clear laserable polycarbonate having a pre-determined shape is surrounded by an area of clear non-laserable polycarbonate. Preferably, no adhesives are used to avoid interference with the luminescence of the ultraviolet fluorescent ink. Polycarbonate lends itself to lamination without adhesives. The visual effect produced by the structure of FIG. 1A is shown in FIGS. 1B and 1C when an ultraviolet light L illuminates the front side of the identification device 10. The clear laserable polycarbonate, including windows 16 and 30, permit a person or machine to view light of a wavelength of interest passing through the windows and interacting with the security feature. More specifically, FIG. 1B illustrates what is seen from the front side of the substrate when UV light is directed from a light source L positioned on the front side through the window 16 and interfaces with the fluorescent ink 34 and star shaped cut out 24. The blue striped ultraviolet fluorescent ink 34 illuminates and is visible in the oval window 16. However, a different visual effect is seen from the backside of the card. On the backside, as seen in FIG. 1C, the star shaped cut out 24 is illuminated and visible through window 30 as 24', together with the striped blue fluorescent ink 34. The position of the illuminated star pattern 24' in FIG. 1A is not intended to suggest the illuminated star pattern is visually projected outside of the ID. Rather, the illuminated star pattern 24' in FIG. 1A is a representation of what is visible through window 30—as depicted in FIG. 1C. The same is true for the illuminated star patterns 224' and 324' discussed below in connection with the embodiments of FIGS. 2A and 3A.

The foregoing results, and those discussed below, were achieved with a 365 nm UV light source. It is believed this effect is due to the carbon content of the raw clear laserable polycarbonate which fluoresces when exposed to a UV light source of this wavelength in combination with the non-fluorescence of the clear non-laserable polycarbonate when exposed to the same light source.

Thus a different visual effect is achieved on opposite sides of the substrate 10 from a common security feature which, in turn, provides a measure of authenticity of the ID. In ambient conditions, without a source of UV light, the star pattern is invisible from either side of the ID. When an appropriate UV light source is directed toward the front side of the ID, the star pattern 24 is substantially invisible when viewed from the front side of the substrate. However, the star pattern 24 is illuminated (at 24') and visible from the backside of the card through window 30. The fluorescent ink 34 is illuminated and its luminescence is visible on both sides of the substrate through windows 16 and 30 but the illuminated star 24' is predominantly visible only on one side of the substrate, specifically the backside. In some circumstances, the cut out 24 may be faintly visible on the front side of the substrate but this is believed due to distortion in the pattern of UV ink 34 resulting from the lamination process. Accordingly, when the UV fluorescent ink 34 is placed between the cut out 24 and the UV light source L, the pattern 24 will illuminate as 24' and will be dominantly visible through the window 30 only on a single side of the substrate.

Figure 1D:
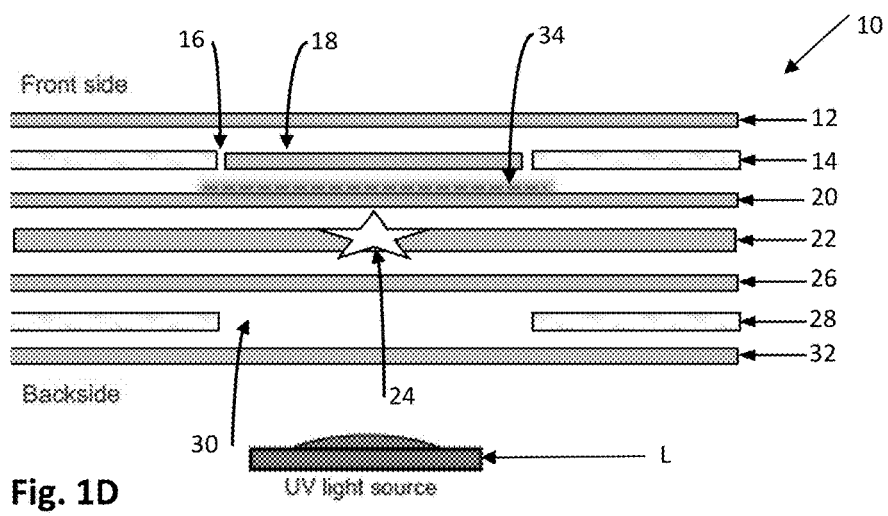
FIG. 1D is a cross-sectional exploded view of the first embodiment of a laminated identification device according to the present disclosure with a UV light illuminating the backside of the ID.
Figure 1E:
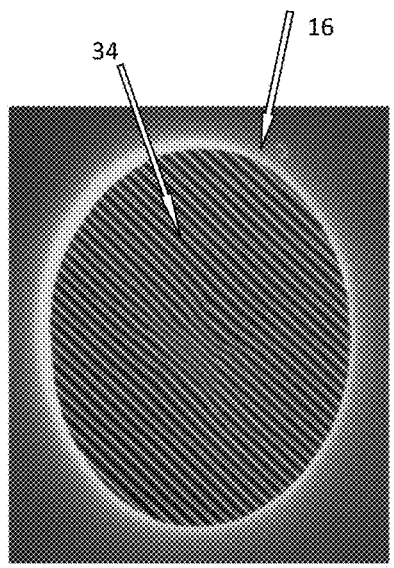
FIG. 1E is a top plan view of the window taken from the front side of FIG. 1D.
Figure 1F:
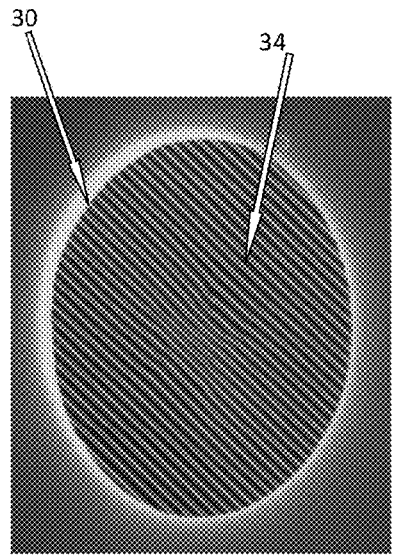
FIG. 1F is a bottom plan view of the window taken from the backside of FIG. 1D.

For comparison purposes, FIG. 1D illustrates the same embodiment as FIG. 1A, but the ultraviolet light L is positioned to illuminate the backside of the ID 10 rather than the front side. As seen in FIGS. 1E and 1F, the cut out 24 is not illuminated through either window 16 or window 30, respectively. The blue fluorescent ink, applied in stripes, is illuminated but not the star pattern 24. Subtle distortions are faintly visible where the ink 34 moved as a result of the lamination process. Accordingly, as illustrated by FIGS.

1A-1F, multiple different visual effects result from a single structure which can be used to authenticate the veracity of the ID 10.

Figure 2A:
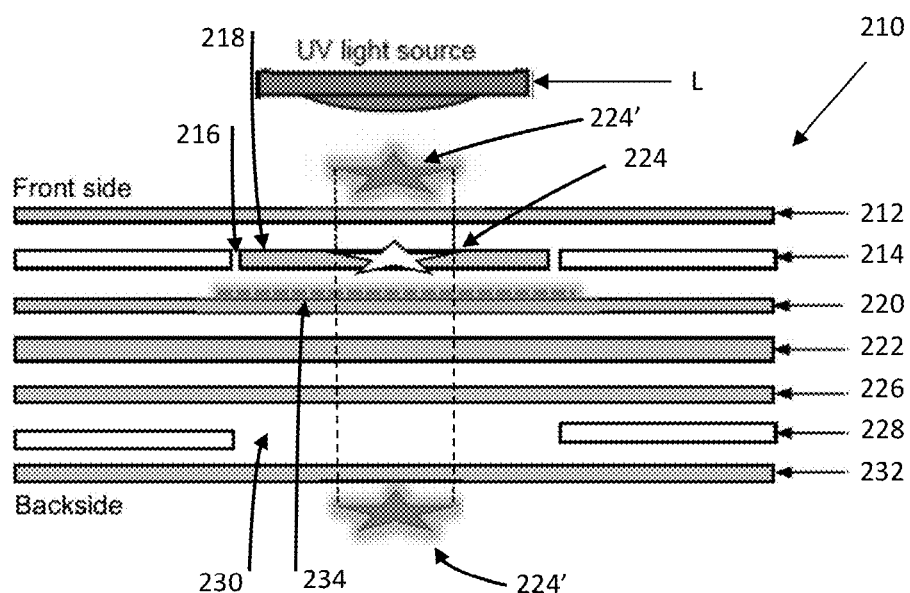
FIG. 2A is a cross-sectional exploded view of a second embodiment of a laminated identification device according to the present disclosure, with a UV light illuminating the front side of the ID.
Figure 2B:
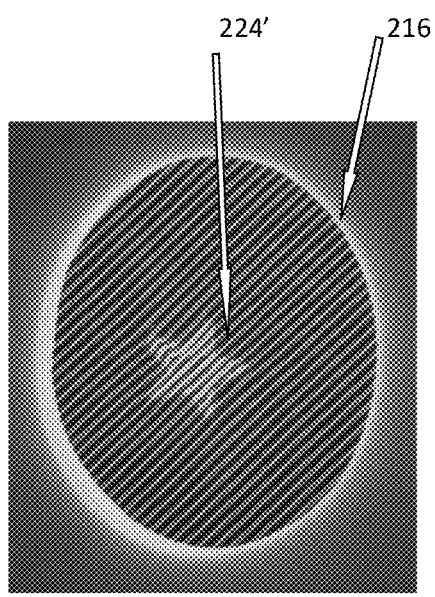
FIG. 2B is a top plan view of the window taken from the front side of FIG. 2A.
Figure 2C:
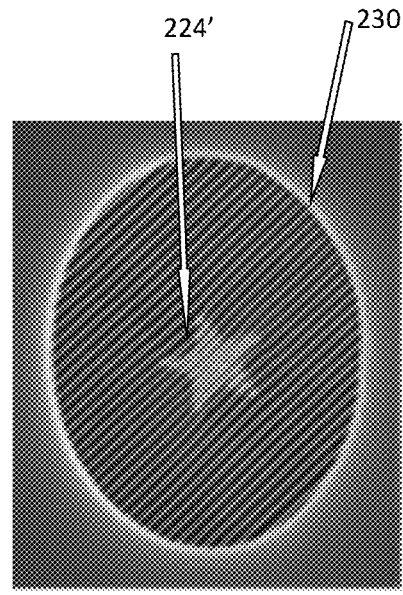
FIG. 2C is a bottom plan view of the window taken from the backside of FIG. 2A.

Turning to FIGS. 2A-2C, a second embodiment of an identification device according to aspects of the present disclosure is illustrated. In this embodiment, the ID is in the form of a laminated substrate 210. The layers are generally the same as in the first embodiment shown in FIGS. 1A-1C. However, in the second embodiment, the star pattern 224 is formed in a clear non-laserable polycarbonate insert 218 positioned in the window 216 formed in layer 214 rather than layer 222. The window 230 is filled by clear laserable polycarbonate from the surrounding layers 226 and 232, but an insert (not illustrated) could be positioned in the window or opening 230 prior to lamination. The star pattern 224 will be filled with clear laserable polycarbonate from either or both adjacent layers 212 and 220. As shown in FIGS. 2B and 2C, with the UV light positioned on the front side of the ID 210, the star pattern 224 illuminates as 224' visible through both the window 216 and window 230. However, the intensity or strength of the illumination is different between the two sides. The illumination of the UV fluorescent stripes 234 and the star pattern 224 are stronger or more intense through window 216 (224', FIG. 2B) which is on the same side of the ID as the UV light source L. The star pattern 224 is substantially invisible in the absence of the UV light stimulation. Again, the visual differences between the front side and the backside with the UV light applied, and also accounting for the visual non-appearance in ambient light, provides a security feature that can assist in the verification of an ID. The foregoing results were achieved with a 365 nm UV light source.

Figure 2D:
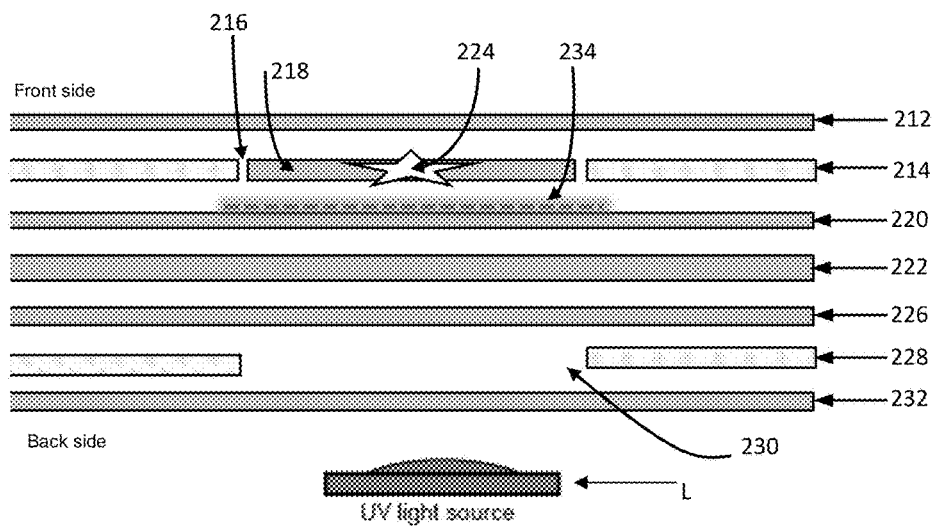
FIG. 2D is an identical view to that of FIG. 2A, except the UV light is illuminating the backside of the ID.
Figure 2E:
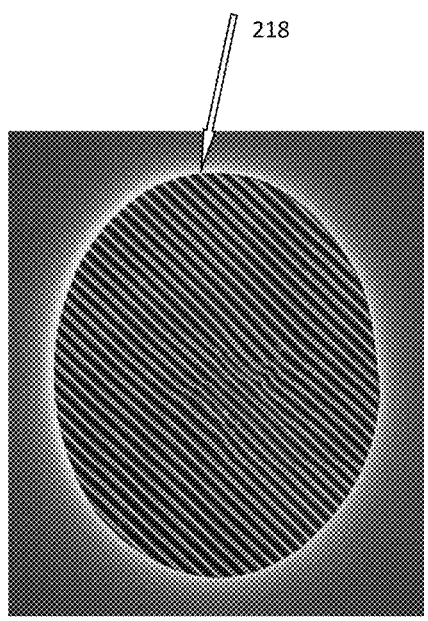
FIG. 2E is a top plan view of the window taken from the front side of FIG. 2D.
Figure 2F:
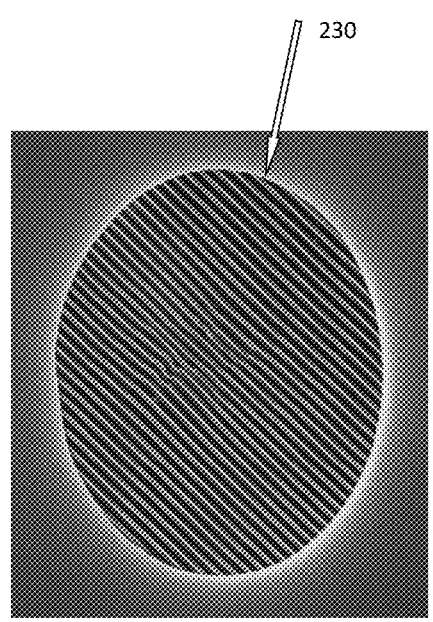
FIG. 2F is a bottom plan view of the window taken from the backside of FIG. 2D.

FIGS. 2D-2F illustrate the visual effect of repositioning the UV light source L from the front side of the ID 210 to the backside. As is seen in FIGS. 2E and 2F, the striped ultraviolet fluorescent ink 234 is visible in both front side window 216 and backside window 230, but the star pattern 224 is not visible in either window. Taking into account the images of FIGS. 2B, 2C, 2E and 2F, the visual differences between the front side and the backside with the UV light applied on the front side and the backside, and also accounting for the visual appearance in ambient light, provides a unique security feature that can assist in the verification of an ID.

FIGS. 3A-3C illustrate a third embodiment of a security feature utilized with an ID 310. This embodiment is similar to that illustrated in FIG. 2A. Using the embodiment of FIG. 2A as a reference, clear laserable polycarbonate layer 220 is removed and ultraviolet fluorescent ink 234 is moved to the front side surface of clear laserable polycarbonate layer 326. Thus, the area of ultraviolet fluorescent ink 334 is a farther distance from the cutout 324 in the embodiment of FIG. 3A compared to the ultraviolet fluorescent ink 234 and cutout 224 in FIG. 2A. More particularly, the entirety of layer 322, a 7 mil thick clear non-laserable polycarbonate layer is positioned between the cut out 324 and the ink 334, whereas in the embodiment of FIG. 2A, the ink 234 is adjacent to the cut out 224. The visual effect of moving the ink farther from the cut out 324 is seen in FIGS. 3B and 3C. In these Figures, the intensity or strength of the illuminated star pattern 324' is less than that of FIGS. 2B and 2C. Indeed, the illuminated star pattern 324' in FIG. 3C is quite faint. This suggests that enlarging the distance even farther between the cut out 324 and the ink layer 334 could cause the cut out 324 as seen in window 330 to become nearly, if not completely, invisible, while still being visible through the window 316 viewable on the front side of the ID 310.

Specific details are given in the description to provide a thorough understanding of the embodiments. However, it will be understood by one of ordinary skill in the art that the embodiments may be practiced without these specific details. For example, additional layers may be added or removed and the contrasting visual effect would still be present but perhaps to a lesser degree. Additional layers could also be added to form a final or finished ID, or the substrate as illustrated in the first, second and third embodiments may be the final product. Windows 16 and 30, 216 and 230, and 316 and 330, respectively, may be different shapes from each other and may be a shape other than an oval. Star pattern 24, 224 and 324 may be different geometric shapes, or be in the shape of a logo, symbol or words as may be formed with a cut out. Additional security indicia may be added, for example by laser etching words and/or images into the clear laserable polycarbonate windows 16, 30, 216, 230, 316 and 330. The pattern 24, 224 and 324 could be positioned such that it appears at a specific location in relation to a laser etched image also appearing in the same window. Further still, the UV fluorescent ink 34, 234 and 334 may be a different color than blue or more than one color. The ink may also be applied in a pattern or as a solid, or as a combination of patterns and solids.

It should also be understood by those of ordinary skill in the art upon review of the present disclosure that the security features disclosed herein also may be used in combination with other security features, including but not limited to biometrics, integrated circuit chips, holograms and the like. In this manner, additional layers of security are provided.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:
1. A secure laminate, comprising:
a core layer, at least a portion of which is clear non-laserable polycarbonate, the core layer having a first major surface and a second major surface opposing the first major surface, and a hole passing through the at least clear non-laserable polycarbonate portion, the hole having a shape and filled with clear laserable polycarbonate;
a first clear laserable polycarbonate layer positioned adjacent the first major surface of the core layer;
a second clear laserable polycarbonate layer positioned adjacent the second major surface of the core layer;
a first opaque layer positioned adjacent the first clear laserable polycarbonate layer and on the opposite side of the first clear laserable polycarbonate layer from the core layer, and a first window formed through the first opaque layer, the first window aligned with the hole, the first opaque layer defining a front side of the laminate;
a second opaque layer positioned adjacent the second clear laserable polycarbonate layer and on the opposite side of the second clear laserable polycarbonate layer from the core layer, and a second window formed through the second opaque layer, the second window aligned with the hole and the first window, the second opaque layer defining a backside of the laminate; and
an area of ultraviolet fluorescent ink positioned between the first opaque layer and the core layer, and aligned with the first and second windows and the hole;

wherein, in ambient light conditions the hole is not visible from either the front side of the laminate through the first window or from the backside of the laminate through the second window, and when an ultraviolet light source is directed at the front side of the laminate the shape of the hole is illuminated through the second window on the backside of the laminate but not through the first window on the front side of the laminate.

2. The secure laminate of claim 1, wherein when an ultraviolet light source is directed at the backside of the laminate, the shape of the hole is not illuminated through the first window or the second window.

3. The secure laminate of claim 1, wherein the entirety of the core layer comprises clear non-laserable polycarbonate.

4. The secure laminate of claim 1, wherein the core layer comprises opaque polycarbonate, and wherein a window is formed in the core layer and is filled with clear non-laserable polycarbonate, and the hole is formed in the clear non-laserable polycarbonate.

5. The secure laminate of claim 4, wherein the opaque polycarbonate is white polycarbonate.

6. The secure laminate of claim 1, wherein the shape of the hole is at least one of a geometric shape, a non-geometric shape, a logo, a name, a face, and a symbol.

7. The secure laminate of claim 1, wherein at least one of the first or second opaque layers comprises white polycarbonate.

8. The secure laminate of claim 1, further comprising a third clear laserable polycarbonate layer adjacent to and outside of the first opaque layer and a fourth clear laserable polycarbonate layer adjacent to and outside of the second opaque layer.

9. The secure laminate of claim 1, wherein the area of ultraviolet fluorescent ink forms at least one of a pattern and a solid.

10. The secure laminate of claim 9, wherein the pattern is a striped pattern.

11. The secure laminate of claim 1, wherein when an ultraviolet light is applied to either the front side or the backside of the ID, the ultraviolet fluorescent ink illuminates in the first and second window.

12. The secure laminate of claim 1, wherein the area of ultraviolet fluorescent ink comprises a plurality of different ultraviolet fluorescent inks.

13. A secure laminate, comprising:
 a core layer, at least a portion of which is clear non-laserable polycarbonate, the core layer having a first major surface and a second major surface opposing the first major surface, and a first hole passing through the at least clear non-laserable polycarbonate portion, the first hole having a shape and filled with clear laserable polycarbonate;
 a first clear laserable polycarbonate layer positioned adjacent the first major surface of the core layer, and defining a front side of the laminate;
 a second clear laserable polycarbonate layer positioned adjacent the second major surface of the core layer;
 an area of ultraviolet fluorescent ink positioned between the core layer and the second clear laserable polycarbonate layer, and aligned with the hole in the clear non-laserable polycarbonate portion of the core layer;
 a clear non-laserable polycarbonate layer positioned adjacent to the second clear laserable polycarbonate layer, on the side opposite the core layer;
 a third clear laserable polycarbonate layer positioned adjacent the clear non-laserable polycarbonate layer on the side opposite the core layer;
 a first opaque polycarbonate layer positioned adjacent to the third clear laserable polycarbonate layer on the side opposite the core layer, a second hole formed in the opaque layer, the second hole aligned with the first hole; and
 a fourth clear laserable polycarbonate layer positioned adjacent the opaque layer on the side opposite the core layer and defining the backside of the laminate;
 wherein, in ambient light conditions the first hole is not visible from either the front side of the laminate or the backside of the laminate, and when an ultraviolet light source is directed at the front side of the laminate the ultraviolet fluorescent ink illuminates the shape of the first hole, the illumination of the shape of the first hole visible from the front side of the laminate and from the backside of the laminate, and the illumination of the shape of the first hole is stronger from the front side than the backside.

14. The secure laminate of claim 13, wherein when an ultraviolet light source is directed at the backside of the laminate, the ultraviolet fluorescent ink illuminates and the shape of the first hole is not visible from either the front side or the backside of the laminate.

15. The secure laminate of claim 13, wherein when an ultraviolet light is applied to either the front side or the backside of the ID, the ultraviolet fluorescent ink illuminates in the first and second window.

16. The secure laminate of claim 13, wherein the core layer comprises a second opaque polycarbonate layer with a third hole formed therein, and the clear non-laserable polycarbonate portion is disposed with the third hole, and the third hole is aligned with the second hole.

17. The secure laminate of claim 13, wherein the shape of the first hole is at least one of a geometric shape, a non-geometric shape, a logo, a name, a face, and a symbol.

18. The secure laminate of claim 13, wherein the area of ultraviolet fluorescent ink forms at least one of a pattern and a solid.

19. The secure laminate of claim 13, wherein the area of ultraviolet fluorescent ink comprises a plurality of different ultraviolet fluorescent inks.

20. A method of making the secure laminate of claim 1, the method comprising:
 providing the core layer;
 forming the hole in the core layer;
 positioning the first clear laserable polycarbonate layer on the first major surface of the core layer;
 positioning the second clear laserable polycarbonate layer on the second major surface of the core layer;
 applying the ultraviolet fluorescent ink to a surface of the first clear laserable polycarbonate layer at a position aligned with the hole in the core layer; and
 applying pressure and heat to the layers to cause the hole to fill with clear laserable polycarbonate and to form a single laminate from the layers.

21. A method of making the secure laminate of claim 13, the method comprising:
 providing the core layer;
 forming the hole in the core layer;
 positioning the first clear laserable polycarbonate layer on the first major surface of the core layer;
 positioning the second clear laserable polycarbonate layer on the second major surface of the core layer;
 applying the ultraviolet fluorescent ink between the core layer and the second clear laserable polycarbonate layer at a position aligned with the hole in the core layer; and applying pressure and heat to the layers to cause the hole to fill with clear laserable polycarbonate and to form a single laminate from the layers.

* * * * *